Oct. 15, 1929.    R. H. SMITH    1,731,355

CUT-OFF MECHANISM FOR METAL WORKING MACHINES

Filed Oct. 3, 1924

Inventor
Roy H. Smith
Thurston Knox & Hudson
attys.

Patented Oct. 15, 1929

1,731,355

UNITED STATES PATENT OFFICE

ROY H. SMITH, OF KENT, OHIO

CUT-OFF MECHANISM FOR METAL-WORKING MACHINES

Application filed October 3, 1924. Serial No. 741,325.

This invention relates to cut-off mechanisms for metal working machines of the type wherein stock fed into the machine is cut into suitable lengths and headed, trimmed or otherwise acted upon by tools.

The principal object of the invention is to provide an improved cut-off mechanism or cut-off of the type wherein a cutter carried by a cutter bar or slide moves back and forth at right angles to the direction of feed of the stock, and the more specific objects are provided by means for positively moving the bar or slide forwardly and rearwardly so as to obtain the following advantages:—omission of all springs in the working parts and greater safety to the operator; better wearing qualities, greater speed of operation, accuracy in action and ease of adjustment to compensate for wear, elimination of lost motion in the working parts and quietness of action.

The above are obtained very effectively by the present invention, which may be here briefly summarized as consisting in certain novel details of construction, and combinations and arrangements of parts which will be described in the specification and set forth in the appended claims.

Figure 1:
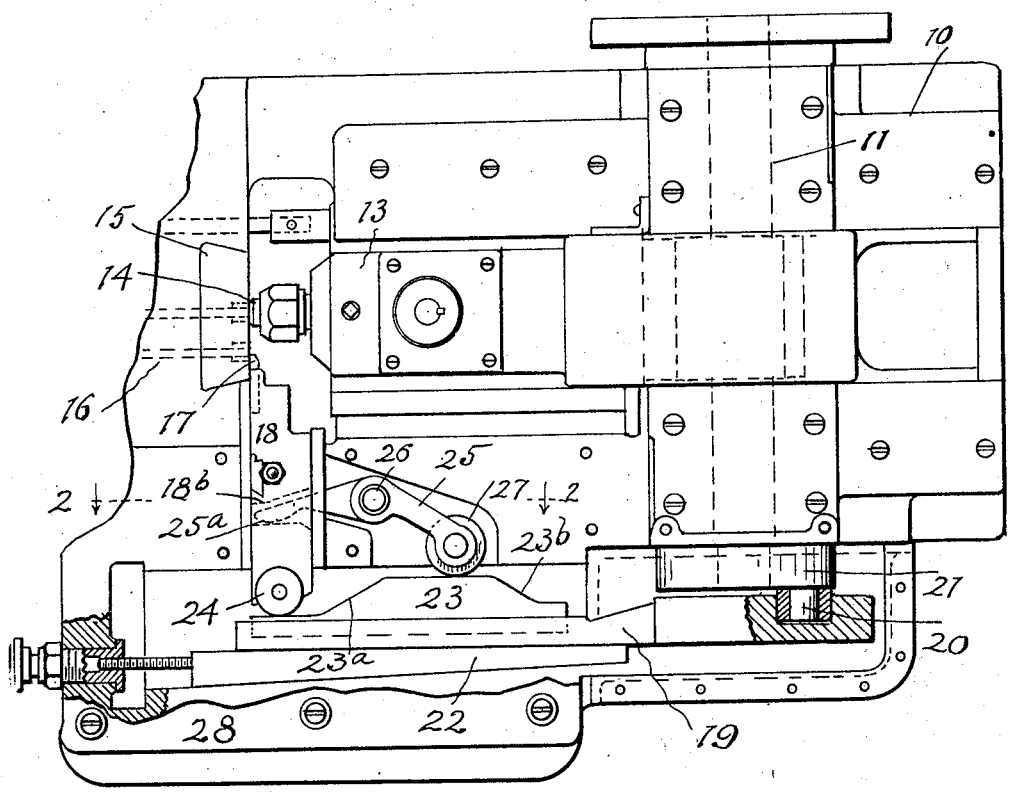
Figure 2:
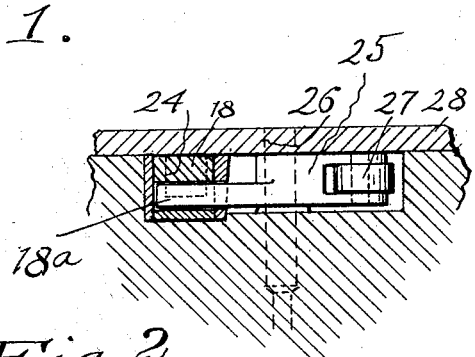

In the accompanying drawings wherein I have shown the preferred embodiment of the invention, Fig. 1 is a plan view showing my invention applied to a machine of the header type; Fig. 2 is a detail section along the line 2—2 of Fig. 1, looking in the direction indicated by the arrows.

Referring now to the drawing, 10 represents a horizontal bed or frame of the machine which may be used for a variety of purposes such as for forming rivet or bolt blanks or the like, the only essential part being the stock cutting mechanism for cutting the stock which is fed into the machine into suitable lengths which may then be operated on by tools of any desired form.

At the forward part of the machine, as here illustrated, is a crank-shaft 11, or eccentric shaft which reciprocates a horizontally movable slide or plunger 13, suitably guided in the frame and provided at its forward end with a tool 14, adapted to operate on the stock after the latter has been cut into the required lengths by the stock cutting mechanism. Forwardly of the tool 14, is a die block 15, which may be provided with suitable dies, the particular shape or purpose of which is immaterial. The stock is adapted to be fed through an opening 16, extending through the end of the machine and through the die block, and is adapted to be cut into sections when projected beyond the face of the die block.

For the purpose of cutting the stock into sections, a reciprocating cutter 17 is employed, adapted to move across the face of the die block 15, this cutter being carried by a cutter bar or slide 18, movable in a passageway extending through the side of the machine. The sides and bottom of this passageway may be provided with suitable gibs or levers $18^a$, adjustable if necessary, to compensate for wear.

For the purpose of reciprocating the cutter bar or slide 18, I employ a slide 19, suitably guided for reciprocating motion in the frame of the machine, its movement being at right angles to the movement of the bar or slide 18 carrying the cutter. The slide 19 may be actuated in any suitable manner, but in this instance it is reciprocated by a crank-pin 20 of a crank-disk 21, mounted on one end of the crank-shaft 11. For adjustment purposes the rear side of the passageway receiving the slide 19 may be formed by an adjustable gib 22.

The slide 19 carries a double-acting cam 23, having two cam surfaces $23^a$ and $23^b$, suitably spaced apart and connected by a straight portion $23^c$. The cam surface $23^a$ is utilized to move the cutter bar or slide 18 inwardly to cut off the stock, and for that purpose the outer end of the bar or slide 18 is provided with a roller 24, which the cam surface $23^a$ is adapted to engage on the inward movement of the slide 19. This cuts off a suitable section of the stock and carries the cut-off section over into line with the tool 14. For the purpose of retracting the slide 18 I employ a pivoted lever 25, pivoted between its ends on a pin 26, mounted in frame 10. The rear end of this lever carries a roller 27 adapted to ride over the surface $23^b$ and $23^c$ of the cam. The forward end of the lever 25 projects into an opening 18$^b$ of bar or slide 18, and one portion 25$^a$ of the lever is in constant engagement with one wall of the slot or opening 18$^b$.

The action is such that as slide 19 and cam 23 are moved inwardly or forwardly, the roller 24 rides up the cam surface 23$^a$, and at the same time the roller 27 rides down the cam surface 23$^b$. During this movement of the slide 19, the stock is cut off and carried over in line with tool 14. When the slide 19 is retracted or moved to the right, as shown in the drawings, the cam surface 23$^b$ positively rocks the lever 25, the roller 27 then riding up the cam surface 23$^b$ and the roller 24 then riding down the cam surface 23$^a$. In this manner the bar carrying the cutter is positively actuated in both directions, and the arrangement is such that there is no loose play, the rollers 24 and 27 being kept in contact with the cam surfaces, and the forward end of lever 25$^a$ being kept in constant engagement with bar or slide 18, as previously explained. These features result in quietness of action, and permit the machine to be operated with greater rapidity. Furthermore, the slide 19 and the cam 23 are opposite the end of the bar or slide 18, with the result that force is transmitted or applied to the bar or slide 18 directly in line therewith for actuation in both directions. In consequence there is no component of the force tending to rock or tilt the cutter bar, and this tends towards quietness of action as well as smoothness of action and minimum wear.

The operating parts of the cut-off mechanism will be enclosed by a suitable cover-plate 28, so that there will be no exposed parts liable to cause injury. A portion only of the cover plate is shown in Fig. 1, and a portion in section in Fig. 2.

Any suitable transfer mechanism may be employed with the cutter 17 to transfer the cut-off sections of the stock into line with tool 14. For example, I may employ a common form of transfer mechanism such as shown in Patent No. 1,239,052, granted in the name of Roy H. Smith.

I do not desire to be confined to the precise details shown, but aim in my claims to cover all modifications which do not involve a departure from the spirit and scope of my invention.

Having described my invention, I claim:

1. In a metal working machine of the type wherein stock is fed into the machine and cut into sections, a frame, and stock cutting mechanism comprising a reciprocating slide carrying a cutter, and means for positively actuating the slide in both directions comprising a double-acting cam having aligned cam surfaces, one of said surfaces serving to directly actuate the slide in one direction when the cam is moved in one direction and means operated by the other cam surface when the cam is moved in the opposite direction and connected to the slide to move the latter in the opposite direction.

2. In a metal working machine of the type wherein stock is fed into the machine and cut into sections, a frame, and stock cutting mechanism comprising a slide carrying a cutter, a reciprocating cam arranged opposite the end of the slide and in direct engagement therewith for moving the same in one direction, and a lever operated by the cam and connected to the slide for moving the latter in the opposite direction.

3. In a metal working machine of the type wherein stock is fed into the machine and cut into sections, a frame, and stock cutting mechanism comprising a reciprocating slide carrying a cutter, a reciprocating cam arranged opposite the end of the slide, and a lever connected to the slide, the slide and lever having rollers, and the cam having cam surfaces simultaneously engaged by both rollers, the rollers being alternately acted upon by the cam surfaces to positively move the slide in and out as the cam is reciprocated.

4. In a metal working machine of the type wherein stock is fed into the machine and cut into sections, a frame, and stock cutting mechanism comprising a slide carrying a cutter, a reciprocating cam having aligned cam surfaces, one of said surfaces being engageable with the end of said slide to move the latter in one direction upon movement of said cam, and means connecting the slide and the other cam surface for moving the slide in the opposite direction upon movement of said cam in the opposite direction.

5. In a metal working machine of the type wherein stock is fed into the machine and cut into sections, a frame, and stock cutting mechanism comprising a slide carrying a cutter, a reciprocating cam having aligned cam surfaces, one of which directly engages the end of said slide to move the latter in one direction upon movement of the cam, and means pivoted to said frame and connected to said slide, said means being constantly in engagement with said cam and upon movement of the latter adapted to move the slide in the opposite direction.

In testimony whereof, I hereunto affix my signature.

ROY H. SMITH.